US008526955B2

(12) United States Patent
Lin et al.

(10) Patent No.: US 8,526,955 B2
(45) Date of Patent: Sep. 3, 2013

(54) MOVEMENT PREDICTING METHOD

(75) Inventors: Yi-Bing Lin, Hsinchu County (TW); Chien-Chun Huang-Fu, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 126 days.

(21) Appl. No.: 13/240,039

(22) Filed: Sep. 22, 2011

(65) Prior Publication Data

US 2013/0040644 A1 Feb. 14, 2013

(30) Foreign Application Priority Data

Aug. 12, 2011 (TW) .............................. 100128889 A

(51) Int. Cl.
*H04W 36/00* (2009.01)

(52) U.S. Cl.
USPC ........... 455/436; 455/437; 455/438; 370/330; 370/331; 370/240; 342/352

(58) Field of Classification Search
USPC ................. 455/436–444; 370/330–331, 240; 342/352

See application file for complete search history.

(56) References Cited

U.S. PATENT DOCUMENTS

| | | | | |
|---|---|---|---|---|
| 5,572,221 | A * | 11/1996 | Marlevi et al. ................ | 342/452 |
| 6,385,454 | B1 * | 5/2002 | Bahl et al. ..................... | 455/450 |
| 6,950,656 | B1 * | 9/2005 | Bahk et al. .................... | 455/436 |
| 7,085,569 | B2 * | 8/2006 | Ohmori ....................... | 455/435.2 |
| 7,184,420 | B2 * | 2/2007 | Son et al. ..................... | 370/331 |
| 7,257,405 | B2 * | 8/2007 | Yamato et al. ................ | 455/445 |
| 7,512,068 | B1 * | 3/2009 | Ghaderi Dehkordi et al. ............................. | 370/230 |
| 7,593,727 | B2 * | 9/2009 | Zhao et al. ................. | 455/432.1 |
| 7,657,268 | B2 * | 2/2010 | Oswal et al. ............... | 455/456.3 |
| 7,711,361 | B2 * | 5/2010 | Wang et al. ................ | 455/432.1 |
| 2004/0087305 | A1 * | 5/2004 | Jiang et al. ................ | 455/432.1 |
| 2004/0203778 | A1 * | 10/2004 | Kuo et al. .................... | 455/436 |
| 2006/0189312 | A1 * | 8/2006 | Kubo et al. .................. | 455/434 |
| 2006/0234701 | A1 * | 10/2006 | Wang et al. ................ | 455/432.1 |
| 2007/0177558 | A1 * | 8/2007 | Ayachitula et al. .......... | 370/338 |
| 2008/0013493 | A1 * | 1/2008 | Wu et al. ...................... | 370/331 |
| 2009/0047970 | A1 * | 2/2009 | Kim et al. .................... | 455/450 |
| 2010/0046385 | A1 * | 2/2010 | Kamei et al. ................. | 370/252 |

OTHER PUBLICATIONS

Gonzalez, et al., "Understanding Individual Human Mobility Patterns", Nature, (2008), pp. 779-782, vol. 453.
Salathe, et al., "A High-Resolution Human Contact Network for Infectious Disease Transmission", Proceedings of the National Academy of Science, (2010), pp. 22020-22025, vol. 107.

* cited by examiner

*Primary Examiner* — Charles Shedrick
(74) *Attorney, Agent, or Firm* — Muncy, Geissler, Olds & Lowe, PLLC

(57) ABSTRACT

A movement predicting method is disclosed. The method utilizes at least one phone communicating in and moving between neighboring cells of base stations to predict population movement in a prediction interval. Firstly, obtain the traffic volumes in the cells generated by the phone and the handover information generated by the phone moving between the cells in a day. Next, calculate the traffic volumes and the handover information to obtain a movement probability for the population moving between the cells and an average residence time that the population stays in the region of each cell in the different periods of the day. Finally, according to the data obtained, predict an appearance probability that the population appears in each region at the end point of the prediction interval.

8 Claims, 6 Drawing Sheets

MOVEMENT PREDICTING METHOD

BACKGROUND OF THE INVENTION

1. Field of the Invention

The present invention relates to a predicting method, particularly to a population movement predicting method.

2. Description of the Related Art

Population movement is an important social phenomenon, whereby population spreads globally, and whereby civilization propagates and exchanges, and whereby peoples assimilate and fuse. Population movement also correlates with propagation of infectious diseases. Based on the data collected in the outbreak of dengue fever in 2007-2008 in Rio de Janeiro the second largest city of Brazil, Brazilian researchers pointed out that population movement is a key factor of spreading dengue virus. The research urges a new understanding of the epidemiological dynamics of dengue fever.

A U.S. Pat. No. 5,572,221 disclosed a technology to predict the future population movements via comparing the past movement tracks of mobile terminals with the history records. However, the prior art has the following disadvantages: 1. The technology may infringe right of privacy because it needs to collect movement tracks of a great number of individuals and. 2. The technology is limited in usage because it cannot predict the movements occurring in a specified unit time, such as the morning or afternoon rush hours. 3. The technology cannot predict the position distribution after a specified time point because it cannot estimate the residence time of individuals.

Accordingly, the present invention proposes a movement predicting method to overcome the abovementioned problems.

SUMMARY OF THE INVENTION

The primary objective of the present invention is to provide a movement predicting method, which uses the traffic volumes and handover information of the cells of switching machines in a communication network to establish a population movement model for predicting propagation of infectious diseases or tendencies of traffic flows.

To achieve the abovementioned objective, the present invention proposes a movement predicting method, which predicts the movements of people over a prediction interval, using at least one phone moving between neighboring cells covered by a plurality of base stations. Firstly, obtain the traffic volumes generated by the phones in the cells and the handover information generated by the phones moving between the cells in one day. Next, calculate the traffic volumes and the handover information to obtain the movement probabilities that people move from one cell to the neighboring cells and the average residence time that people stay in one region covered by a cell, for different periods in one day. Next, predict the appearance probabilities that people appear in each region at the end point of the prediction interval according to the start point of the prediction interval, the movement probability, and the average residence time.

Below, the embodiments are described in detail in cooperation with the drawings to make easily understood the technical contents, characteristics and efficacies of the present invention.

DETAILED DESCRIPTION OF THE INVENTION

Figure 1:
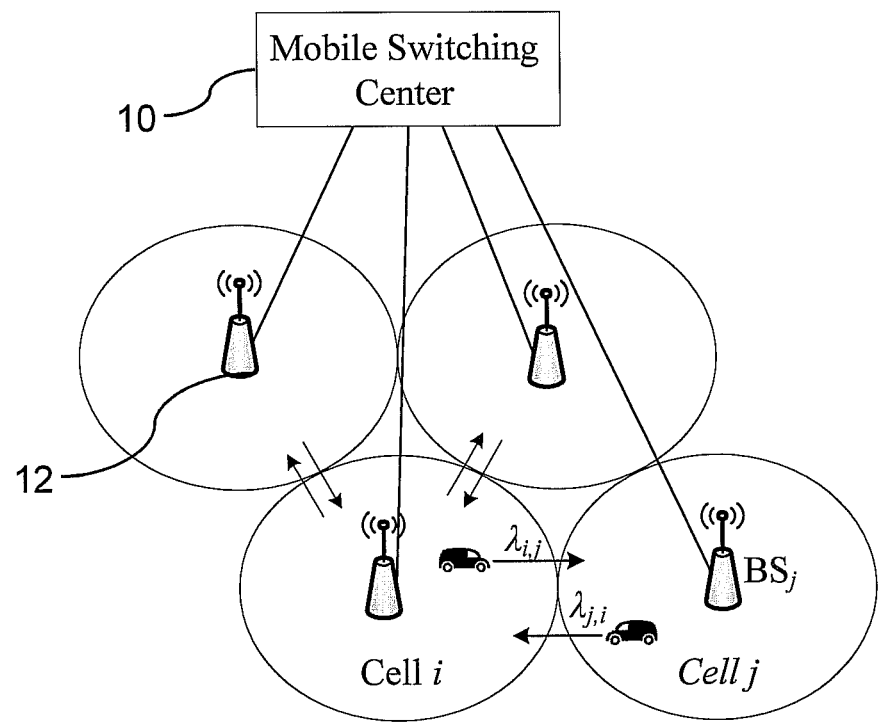
FIG. 1 schematically shows a communication network according to one embodiment of the present invention.

Refer to FIG. 1, wherein a telecommunication network contains a plurality neighboring cells covered by a plurality of base stations 12. The phone inside a cell communicates and transceives data via the corresponding base station 12. The rear end of base stations 12 is a Mobile Switching Center (MSC) 10. The base station 12 records the traffic volume and handover information of each user into the MSC 10.

Figure 2:
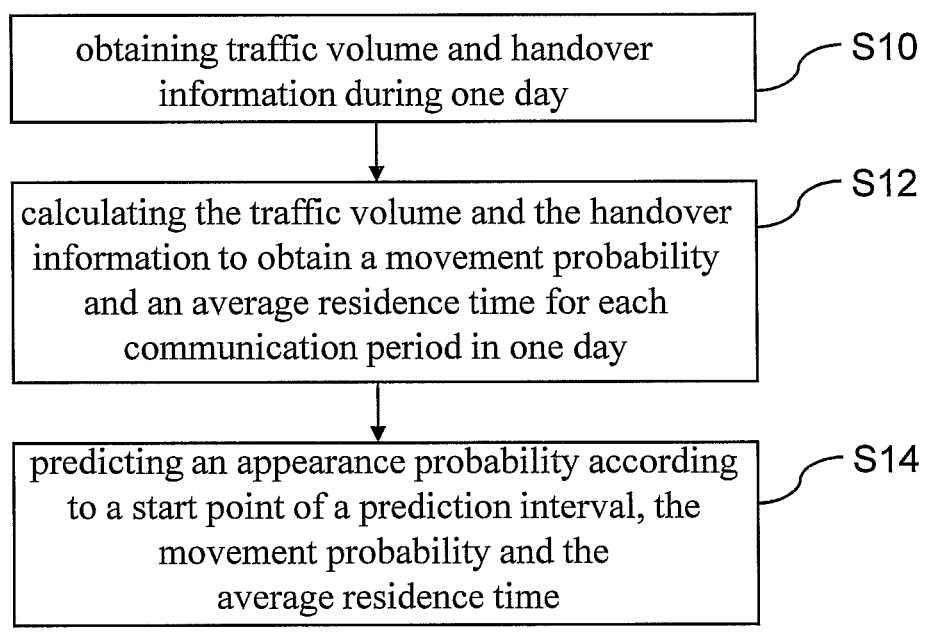
FIG. 2 shows a flowchart of a movement predicting method according to one embodiment of the present invention.

Refer to FIG. 2. The present invention predicts movement of at least one phone (or the user of the phone) communicating in moving between a plurality of neighboring cells covered by a plurality of base stations 12 over a prediction interval. Below, the present invention is exemplified with predicting the movements of phones' users. In Step S10, obtain the traffic volume of a phone in each cell during one day and the handover information of the phone moving between the cells. Next, in Step S12, calculate the traffic volume and the handover information to obtain the movement probabilities that the user moves from a cell to a neighboring cell in different communication periods during one day and the average residence time that the user stays in a cell in different communication periods during one day. Next, in Step S14, predict the appearance probability that the user appears in each region at the end point of the prediction interval according to the start point of the prediction interval, the movement probability, and the average residence time.

Figure 3:
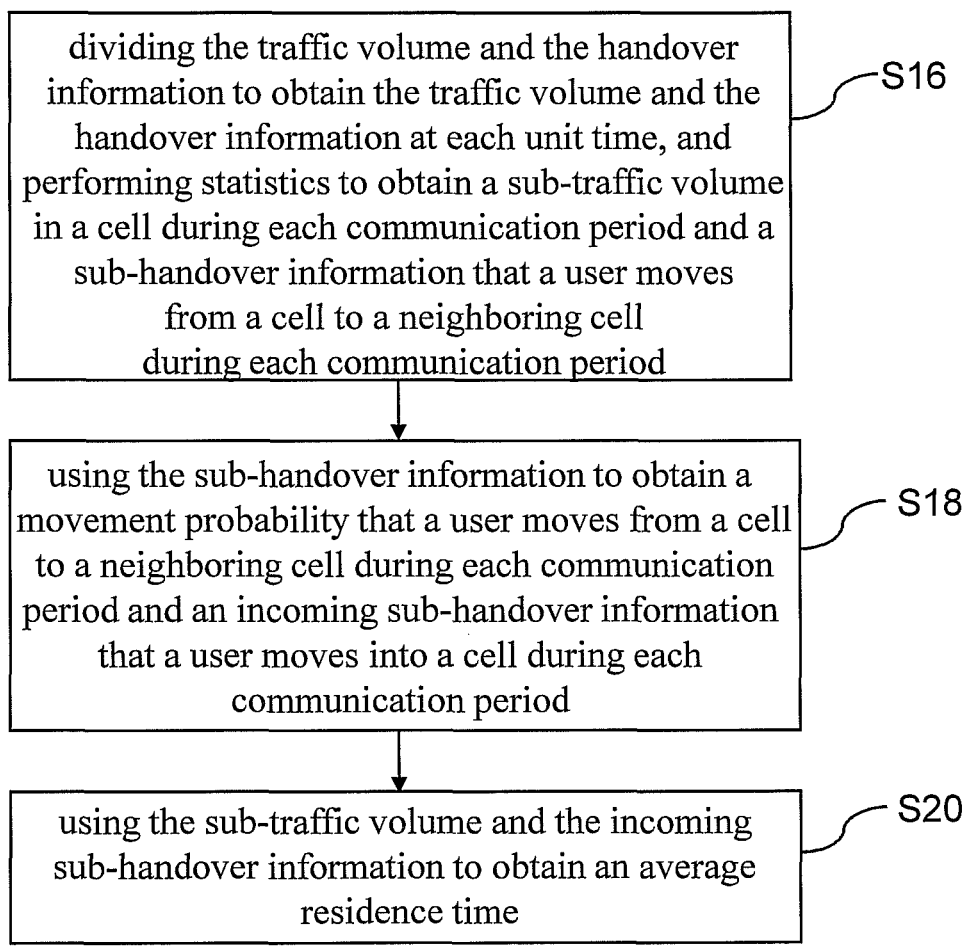
FIG. 3 shows a flowchart of calculating traffic volumes and handover information to obtain movement probabilities according to one embodiment of the present invention.

Refer to FIG. 3. Step S12 further comprises the following steps. In Step S16, divide the traffic volume and the handover information to obtain the traffic volume and the handover information at each unit time $\Delta t$, and perform statistics to obtain a sub-traffic volume $\rho_i(\tau)$ in a cell i during each communication period $\tau$ and a sub-handover information $\lambda_{i,j}(\tau)$ that the user moves from a cell i to a neighboring cell j during each communication period $\tau$. Next, in Step S18, according to sub-handover information $\lambda_{i,j}(\tau)$, obtain a movement probability $p_{i,j}(\tau)$ that the user moves from a cell i to a neighboring cell j during each communication period $\tau$, and an incoming sub-handover information $\lambda_{i,in}(\tau)$ that the user moves into a cell i during each communication period $\tau$. Furthermore, an outgoing sub-handover information $\lambda_{i,out}(\tau)$ that the user moves out of a cell i during each communication period $\tau$ is also obtained in Step S18. $p_{i,j}(\tau)$, $\lambda_{i,in}(\tau)$ and $\lambda_{i,out}(\tau)$ are respectively expressed by Equations (1)-(3):

$$p_{i,j}(\tau) = \frac{\lambda_{i,j}(\tau)}{\sum_{j, j \neq i} \lambda_{i,j}(\tau)} \quad (1)$$

$$\lambda_{i,in}(\tau) = \sum_{j, j \neq i} \lambda_{j,i}(\tau) \qquad (2)$$

$$\lambda_{i,out}(\tau) = \sum_{j, j \neq i} \lambda_{i,j}(\tau) \qquad (3)$$

According to the Little's law, N=λR, wherein N is the average number of persons in a cell during a unit time, and wherein λ is the number of the pieces of the handover information that the users comes into a cell during a unit time, and wherein R is the average residence time that the users stay in a cell. Suppose that the average conversation time is $t_c$ and that the average interval between two conversations is $t_a$. Thus, the conversation probability of each user is $t_c/t_a$. Therefore, Equation (4) and (5) are obtained:

$$\rho_i(\tau) = N\left(\frac{1}{t_a}\right) t_c \Rightarrow N = \rho_i(\tau)\left(\frac{t_a}{t_c}\right) \qquad (4)$$

$$\lambda_{i,in}(\tau) = \frac{t_c}{t_a}\lambda \Rightarrow \lambda = \lambda_{i,in}(\tau)\frac{t_a}{t_c} \qquad (5)$$

Combine the Little's law with Equations (4) and (5) to obtain the average residence time $R_i(\tau)$ expressed by Equation (6):

$$R_i(\tau) = R = \frac{\left(\frac{t_a}{t_c}\right)\rho_i(\tau)}{\left(\frac{t_a}{t_c}\right)\lambda_{i,in}(\tau)} = \frac{\rho_i(\tau)}{\lambda_{i,in}(\tau)} \qquad (6)$$

Next, in Step S20, substitute the sub-traffic volume $\rho_i(\tau)$ and the incoming sub-handover information $\lambda_{i,in}(\tau)$ into Equation (6) to obtain the average residence time $R_i(\tau)$. If the unit time or the average conversation time is very short, or if a more precise average residence time $R_i(\tau)$ is desired, take the outgoing sub-handover information $\lambda_{i,out}(\tau)$ into consideration and express $R_i(\tau)$ with Equation (7):

$$R_i(\tau) = \frac{2\rho_i(\tau)}{\lambda_{i,in}(\tau) + \lambda_{i,out}(\tau)} \qquad (7)$$

Figure 4:
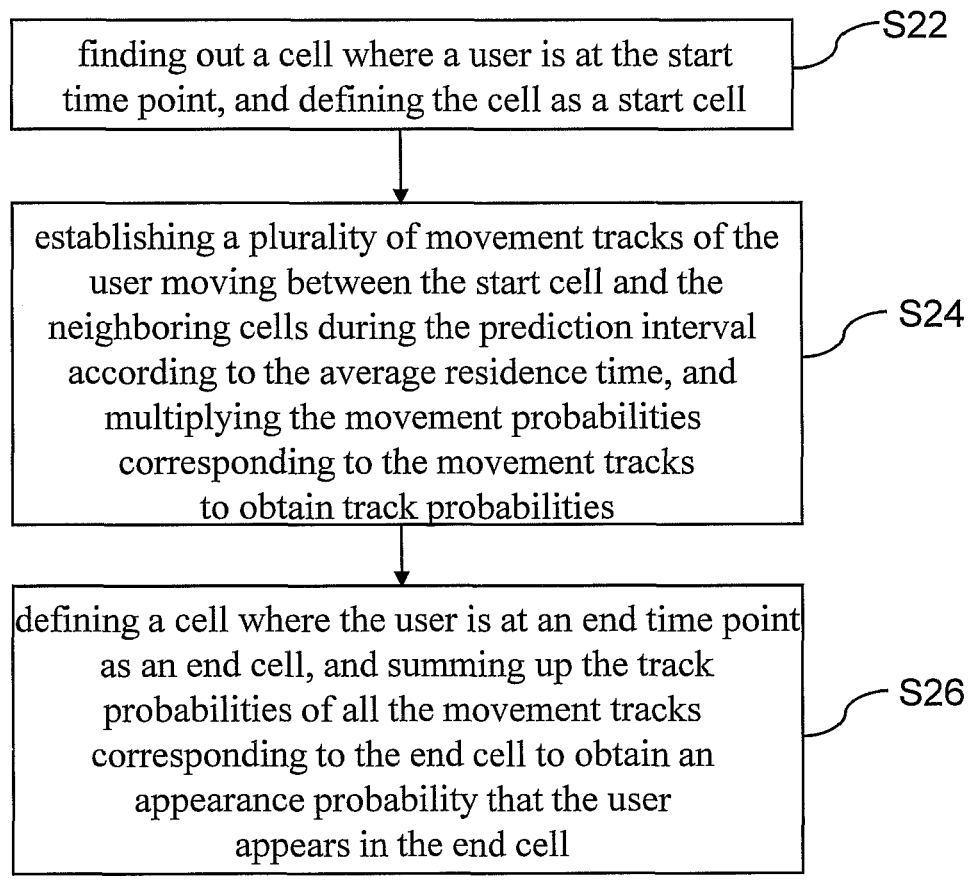
FIG. 4 shows a flowchart of predicting appearance probabilities according to one embodiment of the present invention.

Refer to FIG. 2 and FIG. 4. Step S14 further comprises the following steps. In Step S22, find out the cell where the user is at the start time point, and define the cell as the start cell. Next, in Step S24, establish a plurality of movement tracks of the user moving between the start cell and the neighboring cells over a prediction interval according to the average residence time, and multiply the movement probabilities corresponding to the movement tracks to obtain a track probability. Next, in Step S26, define the cell where the user is at the end time point as the end cell, and sum up the track probabilities of all the movement tracks corresponding to the end cell to obtain the appearance probability that the user appears in the end cell.

Figure 5:
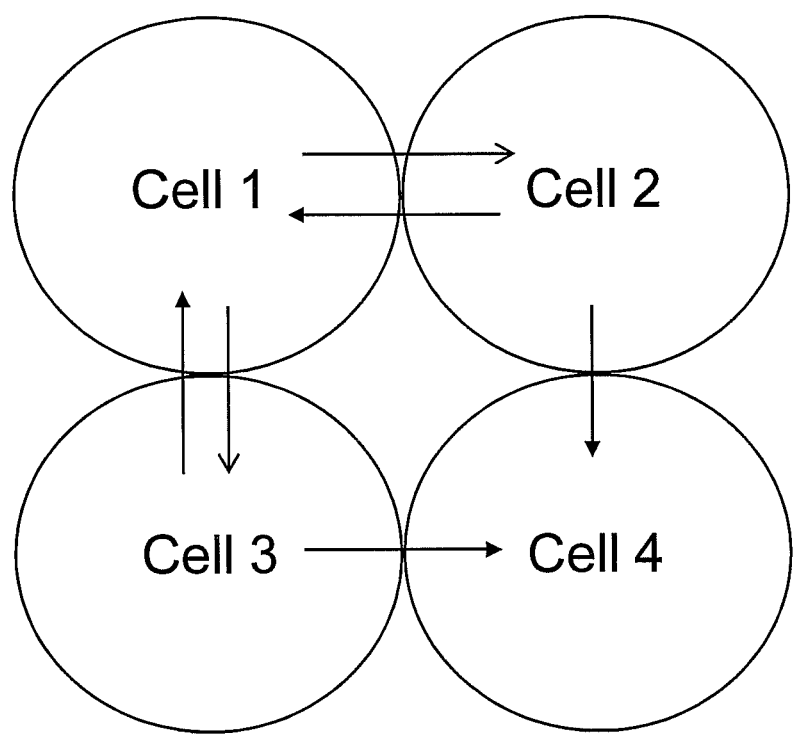
FIG. 5 schematically shows that population moves between four cells according to one embodiment of the present invention.

Refer to FIG. 5, wherein Cell 3 neighbors Cell 1 and Cell 4, and wherein Cell 2 neighbors Cell 1 and Cell 4. Suppose that a unit time has fifteen minutes. Thus, there are totally 96 pieces of unit times one day, and performing statistics can obtain 96 pieces of movement probabilities $p_{i,j}(\tau)$ and 96 pieces of average residence time $R_i(\tau)$ for the unit time 0:00-0:15, 0:15-0:30, ... 23:45-24:00. Suppose a user enters Cell 1 at 0:01. Cell 1 functions as the start cell herein. Suppose the residence time $R_1(0:01)$ in Cell 1 is 20 minutes in the interval 0:00-0:15. It is 0:21 20 minutes later. During the unit time 0:15-0:30, the user may go to Cell 2 or Cell 3. According to statistics, the movement probability from Cell 1 to Cell 2 $p_{1,2}(0:21)$ and the movement probability from Cell 1 to Cell 3 $p_{1,3}(0:21)$ are respectively ⅓ and ⅔ for the unit time 0:15-0:30. According to statistics, the residence time in Cell 2 $R_2(0:21)$ and the residence time in Cell 3 $R_3(0:21)$ are both 20 minutes for the unit time 0:15-0:30. It is 0:41 20 minutes later. During the unit time 0:30-0:45, the user in Cell 2 may go to Cell 1 or Cell 4. According to statistics, the movement probability from Cell 2 to Cell 1 $p_{2,1}(0:41)$ and the movement probability from Cell 2 to Cell 4 $p_{2,4}(0:41)$ are respectively ⅓ and ⅔ for the unit time 0:30-0:45. The user entering Cell 3 during the unit time 0:15-0:30 may go to Cell 1 or Cell 4. According to statistics, the movement probability from Cell 3 to Cell 1 $p_{3,1}(0:41)$ and the movement probability from Cell 3 to Cell 4 $p_{3,4}(0:41)$ are respectively ⅓ and ⅔ for the unit time 0:30-0:45. Therefore, a user entering Cell 1 at 0:01 may be at the end Cell 1 or the end Cell 4 forty minutes later. The movement tracks to the end Cell 1 include Track 1→2→1 and Track 1→3→1. The movement tracks to the end Cell 4 include Track 1→2→4 and Track 1→3→4. Thus, the appearance probability of the user in Cell 1 forty minutes later is $p_{1,2}(0:21) \times p_{2,1}(0:41) + p_{1,3}(0:21) \times p_{3,1}(0:41) = ⅓ \times ⅓ + ⅔ \times ⅓ = ⅓$; the appearance probability of the user in Cell 1 forty minutes later is $p_{1,2}(0:21) \times p_{2,4}(0:41) + p_{1,3}(0:21) \times p_{3,4}(0:41) = ⅓ \times ⅔ + ⅔ \times ⅔ = ⅔$.

Figure 6:
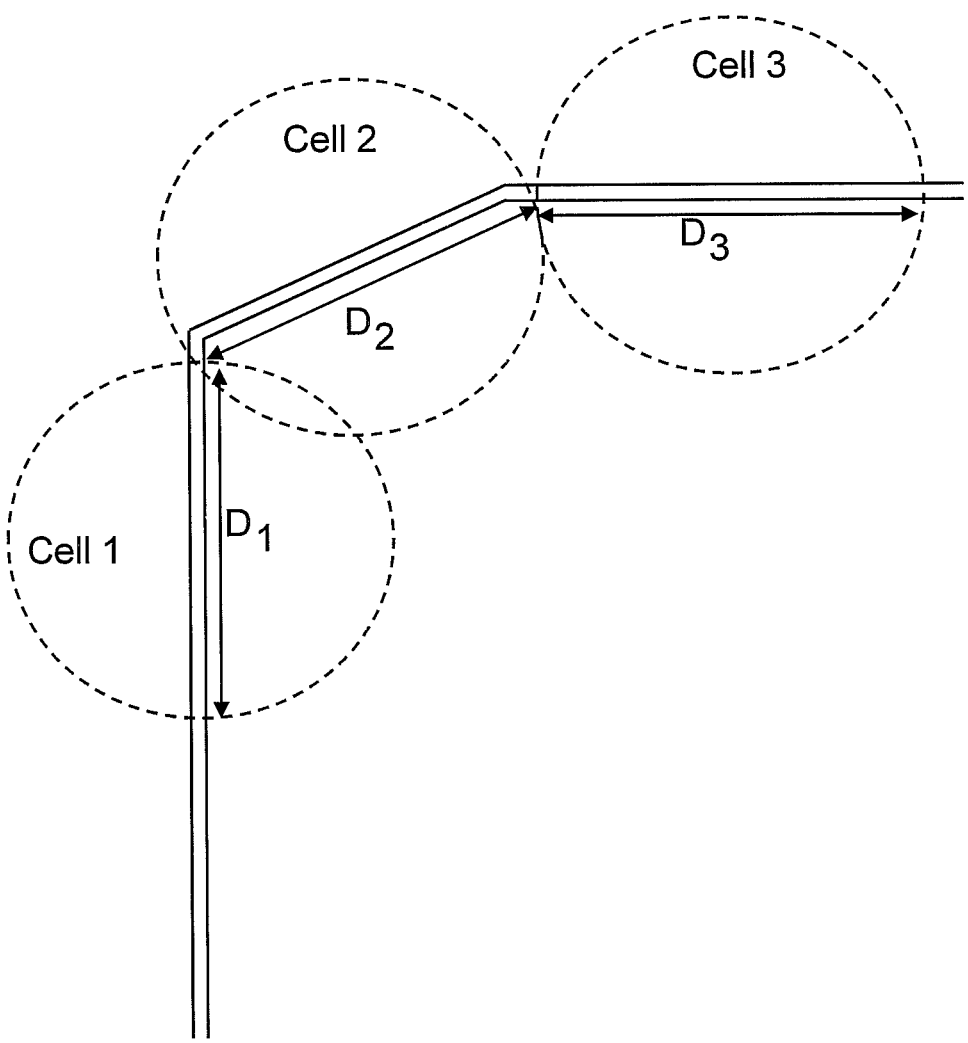
FIG. 6 schematically shows freeway sections covered by several cells according to one embodiment of the present invention.

In conclusion, the present invention can be used to establish a population movement model to predict propagation of infectious fever and traffic status, which correlate with population movement. For example, the present invention can predict the average vehicle speed on a trunk highway. Refer to FIG. 6 schematically showing several freeway sections. Base stations for the areas where a freeway passes are generally constructed along the freeway. Suppose that three sections of a freeway are respectively covered by Cell 1, Cell 2 and Cell 3. The coverage distance $D_i$ of a freeway section covered by a cell can be worked out from the map information and base station construction data or obtained via measurement along the freeway. The method of the present invention can obtain the average residence time $R_i(\tau)$ of the users staying in a cell within a unit time, whereby can be instantly worked out the moving speed $V_i$ at which users move in a cell i during a communication period τ. The moving speed is defined as the average vehicle speed and expressed by Equation (8):

$$V_i = \frac{D_i}{R_i(\tau)} \qquad (8)$$

In conclusion, the present invention uses the traffic volume and handover information in base stations to construct population movement model and predict the population movement-related phenomena.

The embodiments described above are only to exemplify the present invention but not to limit the scope of the present invention. Any equivalent modification or variation according to the spirit of the present invention is to be also included within the scope of the present invention.

What is claimed is:
1. A movement predicting method, which uses at least one phone communicating in and moving between neighboring cells covered by a plurality of base stations to predict movement of users of said phone in a prediction interval, comprising steps:

obtaining traffic volume generated by said phone in each said cell and handover information generated by said phone moving between said cells during one day with said base stations and storing said traffic volume and said handover information into a Mobile Switching Center (MSC);

calculating said traffic volume and said handover information to obtain a movement probability that said user moves from one said cell to a neighboring said cell and an average residence time that said user stays in one region covered by one said cell for each communication period in one day with said MSC; and predicting an appearance probability that said user appears in each said region at an end point of said prediction interval according to a start point of said prediction interval, said movement probability, and said average residence time with said MSC.

2. The movement predicting method according to claim 1, wherein said step of calculating said traffic volume and said handover information to obtain said movement probability and said average residence time further comprises steps performed with said MSC:

dividing said traffic volume and said handover information to obtain said traffic volume and said handover information at each unit time $\Delta t$, and performing statistics to obtain a sub-traffic volume $\rho_i(\tau)$ in one said cell i during each said communication period $\tau$ and a sub-handover information $\lambda_{i,j}(\tau)$ that said user moves from one said cell i to a neighboring said cell j during each said communication period $\tau$;

using said sub-handover information $\tau_{i,j}(\tau)$ to obtain said movement probability $p_{i,j}(\tau)$ that said user moves from one said cell i to a neighboring said cell j during each said communication period $\tau$ and an incoming sub-handover information $\lambda_{i,in}(\tau)$ that said user moves into one said cell i during each said communication period $\tau$, wherein $$p_{i,j}(\tau) = \frac{\lambda_{i,j}(\tau)}{\sum_{j, j \neq i} \lambda_{i,j}(\tau)} \text{ and } \lambda_{i,in}(\tau) = \sum_{j, j \neq i} \lambda_{j,i}(\tau);$$

and using said sub-traffic volume $\rho_i(\tau)$ and said incoming sub-handover information $\lambda_{i,in}(\tau)$ to obtain said average residence time.

3. The movement predicting method according to claim 2, wherein said average residence time is calculated with an equation:

$$R_i(\tau) = \frac{\rho_i(\tau)}{\lambda_{i,in}(\tau)}.$$

4. The movement predicting method according to claim 2, wherein an outgoing sub-handover information $\lambda_{i,out}(\tau)$ that said user moves out of one said cell i during each communication period $\tau$ is also obtained in said step of using said sub-handover information $\lambda_{i,j}(\tau)$ to obtain said movement probability and said incoming sub-handover information, and wherein $$\lambda_{i,out}(\tau) = \sum_{j, j \neq i} \lambda_{i,j}(\tau).$$

5. The movement predicting method according to claim 4, wherein said average residence time is calculated according to said sub-traffic volume $\rho_i(\tau)$, said incoming sub-handover information $\lambda_{i,in}(\tau)$, and said outgoing sub-handover information $\lambda_{i,out}(\tau)$.

6. The movement predicting method according to claim 5, wherein said average residence time is calculated with an equation:

$$R_i(\tau) = \frac{2\rho_i(\tau)}{\lambda_{i,in}(\tau) + \lambda_{i,out}(\tau)}.$$

7. The movement predicting method according to claim 1, wherein said step of predicting said appearance probability at said end point according to said start point, said movement probability and said average residence time further comprises steps performed with said MSC:

finding out said cell used as a start cell where said user is at said start time point;

establishing a plurality of movement tracks of said user moving between said start cell and neighboring said cells during said prediction interval according to said average residence time, and multiplying said movement probabilities corresponding to said movement tracks to obtain track probabilities; and defining said cell where said user is at said end time point as an end cell, and summing up said track probabilities of all said movement tracks corresponding to said end cell to obtain said appearance probability that said user appears in said end cell.

8. The movement predicting method according to claim 1, wherein a moving speed of said user in one said cell i during said communication period $\tau$ is $$\frac{D_i}{R_i(\tau)},$$

and wherein $D_i$ is a coverage distance covered by said cell i, and wherein $R_i(\tau)$ is said average residence time that said user stays in said cell i.

* * * * *